United States Patent [19]

Leppävuori et al.

[11] Patent Number: 4,737,491

[45] Date of Patent: Apr. 12, 1988

[54] WOOD PRESERVATIVE

[75] Inventors: Sirkka L. Leppävuori, Helsinki; Lars H. Petander, Vaasa; Lauri J. Teivainen, Vihti; Håkan E. Wikberg, Mustasaari, all of Finland

[73] Assignee: Kemira OY, Helsinki, Finland

[21] Appl. No.: 743,426

[22] Filed: Jun. 11, 1985

[30] Foreign Application Priority Data

Jun. 20, 1984 [FI] Finland .................................. 842509

[51] Int. Cl.$^4$ .......................... A61K 31/78; C09D 5/14
[52] U.S. Cl. ................................. 514/184; 106/15.05; 106/18.36; 524/413; 525/330.2; 424/81
[58] Field of Search ..................... 525/330.2; 524/413; 424/81; 514/184; 106/18.36, 15.05

[56] References Cited

U.S. PATENT DOCUMENTS

| | | | |
|---|---|---|---|
| 3,078,213 | 2/1963 | Pomot et al. | 514/184 |
| 3,318,827 | 5/1967 | Whittaker et al. | 524/413 X |
| 3,491,189 | 1/1970 | Schuerer et al. | 514/184 |
| 3,779,952 | 12/1973 | Leonard, Jr. | 525/330.2 X |
| 4,181,786 | 1/1980 | Mune et al. | 525/330.2 X |
| 4,465,795 | 8/1984 | Sunano et al. | 106/15.05 X |
| 4,528,185 | 7/1985 | Kraft et al. | 424/81 |

*Primary Examiner*—Earl Nielsen
*Attorney, Agent, or Firm*—Bucknam and Archer

[57] ABSTRACT

A wood perservative is disclosed which contains water, a copper and/or zinc complex or a copper and/or zinc complex together with a zirconium complex, dissolved in water, and an acid which stabilizes the said metals in wood. According to the invention there is used as the acid which stabilizes metals in wood an organic polymer which is soluble in water or forms micelles in water, contains acid groups, and penetrates wood at least partly. Phloroglucin derivatives of fern extract can be used in addition.

5 Claims, No Drawings

WOOD PRESERVATIVE

BACKGROUND OF THE INVENTION

The present invention relates to a wood preservative which contains water, a copper or zinc complex dissolved in water, and an acid which fixes copper or zinc to wood.

Previously known are wood preservatives which contain a metal, usually copper or zinc, which forms amine complexes, and ammonia and carbonic acid. Such a wood preservative solution can be prepared, for example, by allowing ammonia to react with copper carbonate, whereafter the solution thus obtained is stabilized by means of ammonium bicarbonate and, when necessary, by means of carbonic acid.

Thus there are previously known as wood preservatives various compositions based on, for example, copper or zinc. Copper can thus also be fixed to wood in ways other than by precipitating it in the form of carbonate. The so-called CCA salts were developed in the 1930s, and they have since been used generally for protecting wood from decay. Such CCA salts contain copper, chromium and arsenic. Copper is used because of its fungicidal action, whereas arsenic is used mainly in order to produce an insecticidal action. Chromium is used for fixing the copper to the wood. CCA salts provide good protection against decay, but they are an environmental hazard.

One disadvantage of these previously known wood preservatives is that they do not give the wood sufficient dimensional stability. Attempts have been made to eliminate this disadvantage by using water insoluble wood preservatives which, for impregnation, are dissolved in some organic solvent. The penetration of organic solutions such as these into wood is not, however, as good as that of aqueous solutions. Furthermore, organic solvents increase the price of the wood preservative and make it highly flammable. The amount of the organic solvent can be reduced by using micro-emulsions, but such a micro-emulsion is, nevertheless, considerably more expensive than an aqueous solution.

The object of the present invention is thus to provide a water-based wood preservative which is inexpensive, non-toxic and with a high penetration into wood, which is not easily rinsed off from wood and which decreases the absorption of water into the wood.

The object of the present invention is additionally to provide a wood preservative in which the action of copper and zinc is more effective than previously.

Preservatives according to the invention can also be used as fungicides in paints, surface treatment agents, and plant pots.

SUMMARY OF THE INVENTION

Surprisingly, it has now been shown, that the above-mentioned objectives and advantages can be achieved with a wood preservative which contains water, a copper and/or zinc complex dissolved in water, and an organic polymer which is soluble in water or forms micelles in water, contains acid groups, stabilizes copper and/or zinc in wood, and at least in part penetrates wood.

DESCRIPTION OF THE PREFERRED EMBODIMENTS

Also zirconium complexes can be used together with Cu and/or Zn complexes, because zirconium complexes improve the water-resistance of the polymer and enhance the action of Cu and/or Zn against micro-organisms. The Zr complex can be added as a separate salt, for example as ammonium zirconium carbonate, or it can be prepared in a manner corresponding to that of preparing the Cu and Zn amine polymer acid complexes.

The compound used for complexing copper or zinc is preferably ammonia, but it is also possible to use some lower-alkyl-substituted, e.g. methyl-, ethyl- or propyl-substituted primary, secondary or tertiary amine or cyclic amine such as piperidine, morpholine, etc., as stated in claim 5, in which case the formation of a poorly water-soluble or water insoluble copper or zinc polymer in wood is based on the evaporation of the complex-former during the drying stage, or on the neutralization of the complex-former by the acid environment in the wood.

The organic polymer used can be any polymer which penetrates wood in part or entirely, which is soluble in water or forms micelles in water, and which contains carboxylic groups, phenol groups and/or

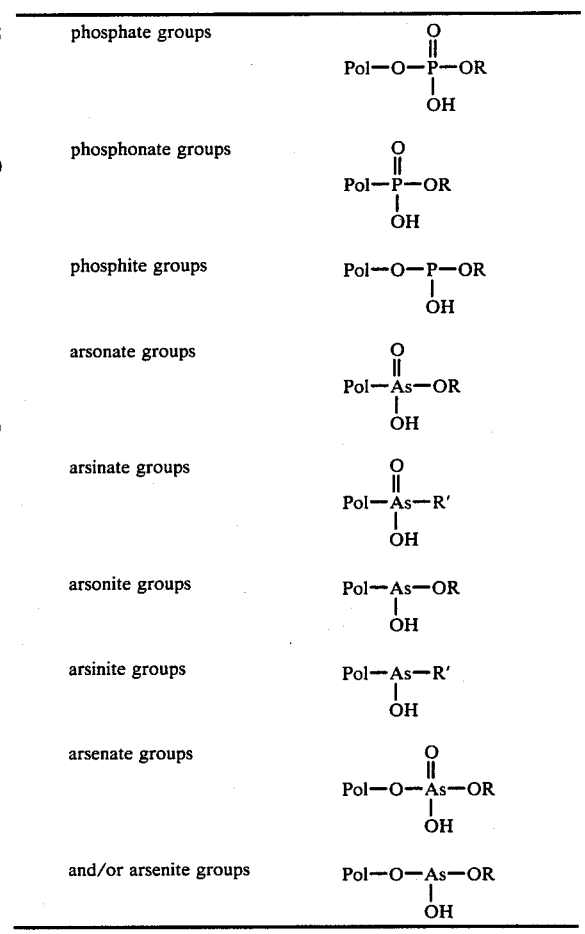

Pol=polymeric group (bonding atom carbon)
R'=an aliphatic, alicyclic or aromatic radical, or a derivative which contains functional groups of these, or a polymer
R=as R', also H The penetration of the polymer into wood can be regulated by means of the molecular weight. If the molecular weight of the polymer does not exceed 2000, it penetrates totally into wood and, if the molecular weight is above this, only partial penetration takes place, whereby surface impregnation is achieved. This molecular weight limit varies with different polymers according to their configuration. For example, for polyethylene glycol it is about 2000.

The solubility of the polymer in water is regulated by means of the degree to which it is hydrophilic, i.e. the quantity of acid groups or other hydrophilic groups, such as hydroxyl, amide or amine groups, contained in it.

The polymer need not be completely water-soluble; it suffices that it is partially water soluble, in which case it can be emulsified into water as micelles. Furthermore, a polymer which contains hydrophobic groups decreases the swelling of wood.

The polymer may be a synthetic or a natural polymer. Radical polymers, condensation polymers and addition polymers are synthetic polymers which can be used.

Some examples of radical polymers are polymerized (met)acrylic, itaconic, maleic, vinylic and (met)allylic phosphanates, phosphoric acids and various arsenic acids. These acid groups can also be produced or fixed to an already existing radical polymer by means of a suitable after-treatment reaction, especially in case a suitable acid monomer is not commercially available.

As the comonomer it is possible to use, for example, other (met)allylic and (met)acrylic compounds, both hydrophobic (e.g. vinyl-alkyl ethers or (met)acrylic esters) and hydrophilic, as well as monomers which contain other than hydrophilic functional groups, for example amido, amino, OH—, halogen and nitrile groups.

Examples of usable condensation polymers are polyesters such as phosphoric acid diol esters and their derivatives; polyamides; amino resins such as urea, melanine, cyanamide, dicyandiamide, guanidine, benzoguanamine resins, etc., which amino resins have been prepared by condensation with aldehyde or ketone; or alcohol-etherized aldehyde condensates; phenol resins, in particular resols and possibly copolymers, provided that these contain one or more of the above-mentioned acid groups.

Polyethylene imine derivatives, polyurethanes and polyethyleneoxy derivatives are mentioned as examples of addition polymers.

Lignosulfonate derivatives, starch derivatives, e.g. phosphated starch, alginates, carboxymethyl cellulose, pectin, and carragene are mentioned as examples of natural polymers.

The equivalent ratio of the acid groups present in the polymer, to the copper or zinc present in the complex is 1:10–10:1, preferably 1:2.

The wood preservative according to the invention contains preferably about 0.05–0.08 mol copper or zinc, 0.1–0.2 mol monovalent acid groups in the polymer, and 0.2–0.4 mol $NH_3$ in one liter of the impregnation solution.

An aqueous solution of copper and/or zinc tetraammonium polyacrylate is an especially advantageous wood preservative.

A quite especially advantageous wood preservative is obtained when a filicin extract obtained from ferns, which is a mixture of phloroglucin derivatives, is further added to the above-mentioned mixtures.

In ferns (Filices) there are commonly present phloroglucin derivatives, which are monocyclic filixic acids and aspidinols, as well as di- and tricyclic derivatives of these. Phloroglucin derivatives can be isolated from ferns by extraction, and this extract, in which phloroglucin derivatives are the most important ingredients, is called crude filicin and crude aspidin. Filixic acids, aspidinols and their derivatives are obtained in pure form from fern extract by isolation, but they can also be prepared synthetically. Until now, fern extract and its ingredients have had uses as repellants against noxious animals such as rodents (cf. FI Lay-Open Print 54 850) and as drugs acting on tapeworms and other intestinal parasites.

It has now been observed that the above-mentioned fern extracts can be used in compositions according to the invention, in which case they enhance the action of the wood preservative against decay and insects.

The invention is described below in greater detail with the aid of examples.

EXAMPLE 1

An impregnation solution as prepared by neutralizing a polyacrylic acid (molecular weight 1600) prepared from 2 mol of acrylic acid with NaOH and by adding to the neutralized solution 1 mol (250 g) of copper sulfate. The precipitated copper polyacrylate was separated by filtration, and 4 mol (272 g 25%) of ammonia was added to it. The obtained solution was diluted so that it contained 0.052 mol (3.3 g) of $Cu^{2+}$/l. The fungicidal action of this solution was tested by the soil box method according to standard 1.4.1.2./70 of NWPC (Nordisk Wood Preservation Council), whereby the following results were obtained.

Blocks of surface wood, size $2\times2\times1.5$ cm$^3$, were impregnated with the solution described above. The impregnated blocks were drained, weighed, dried and re-weighed. The blocks were buried in soil and were checked after 24 weeks.

The weight losses can be seen from the following table:

| Active ingredient | Retention of active ingredient kg/m$^3$ | Weight loss % |
| --- | --- | --- |
| Copper polyacrylate | 1.54 (Cu) | 6.57 |
| | 1.63 | 6.14 |
| | 1.54 | 5.97 |
| | 1.59 | 6.89 |
| Kemira "K 33) | 2.29 (Cu) | 6.86 |
| (a CCA salt) | 2.32 | 7.48 |
| | 2.54 | 7.71 |
| | 2.25 | 7.47 |
| Cu-naphthenate | 2.70 (Cu) | 18.50 |
| | 3.07 | 15.60 |
| | 3.09 | 17.43 |
| | 3.41 | 17.03 |
| Borax | 8.34 (B) | 47.18 |
| | 8.90 | 49.07 |
| | 8.66 | 46.56 |
| | 8.74 | 47.44 |

The weight loss of the blocks treated with Cu-polyacrylate was somewhat less than that of blocks treated with Kemira "K 33" and considerably less than that of the blocks treated with Cu naphthenate, even if the Cu retention was lower in the acrylate. This indicates a synergistic action of copper and polyacrylate.

In the rinsing test, 12% of the copper of Cu polyacrylate was rinsed into the water.

EXAMPLE 2

An impregnation solution was prepared in a manner analogous to Example 1 from a copolymer prepared from an acrylic acid—methyl metacrylate composition, the copolymer containing 72 molar % methyl metacrylate.

The water absorption and dimensional change of the test specimens impregnated with the solution were 60% of the absorption and dimensional change of the untreated test specimens.

In the rinsing tests, 9% of the copper was rinsed into the water.

In soil box tests the weight losses of the blocks impregnated with the solution were the same as the weight losses of the blocks impregnated with the solution mentioned in Example 1.

EXAMPLE 3

0.014 mol of alkyl ammonium chloride was added to a solution prepared according to Example 1. The retention in impregnation was 2 kg copper/m³ surface wood.

In soil box tests the weight losses of the impregnated blocks were 21% less than the weight losses of the untreated blocks. In the rinsing test, 12% of the copper was rinsed into the water.

EXAMPLE 4

A solution was prepared which contained, per one liter, 0.076 mol of zinc; a polymer prepared from 0.152 mol of acrylic acid; and 0.304 mol of ammonia. The retention in the impregnation was 3 kg zinc/m³ of surface wood. In soil box tests the weight losses of the impregnated blocks were 30% less than the weight losses of the untreated blocks.

EXAMPLE 5

A solution was prepared which contained, per one liter, 0.052 mol of copper; a copolymer prepared from 0.052 mol of maleic anhydride and 0.052 mol of styrene; and 0.208 mol of ammonia. The retention in impregnation was 2 kg of copper/m³ of surface wood.

EXAMPLE 6

A solution was prepared which contained, per one liter, 0.052 mol of copper; a polymer prepared from 0.104 mol of vinyl phosphate; and 0.208 mol of ammonia. The retention in the impregnation was 2 kg of copper/m³ of surface wood.

What is claimed is:

1. A wood preservative composition comprising water and at least one metal complex selected from the group consisting of copper and zinc complexes, dissolved in water, and an acid which stabilizes said metals in wood, said acid being a polyacrylic acid having a molecular weight of less than 2000, which acid is soluble in water or forms micelles in water, and penetrates wood at least in part.

2. The wood preservative composition of claim 1, wherein the equivalent ratio of the acid groups present in the polyacrylic acid, to said metal present in the complex is 1:10–10:1.

3. The wood preservative composition of claim 1, wherein said metal complex is formed with a complexing agent and the complexing agent is an easily volatile compound having the formula:

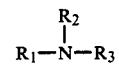

wherein $R_1$, $R_2$ and $R_3$ are hydrogen or lower alkyl or $R_1+R_2$ are $-(CH_2)_m-$ or $-(CH_2)_n-X-(CH_2)_n$, wherein $X=O$ or $NR_3$, $n=2, 3$ and $m=5-6$.

4. The wood preservative composition of claim 1, which is an aqueous solution of a copper or zinc tetraammonium polyacrylate or mixtures thereof.

5. The wood preservative composition of claim 1, which contains 0.05–0.08 mol of copper or zinc or both copper and zinc, 0.1–0.2 mol of the polyacrylic acid, and 0.2–0.4 mol of ammonia in one liter of solution.

* * * * *